United States Patent Office 3,404,121
Patented Oct. 1, 1968

3,404,121
POLYESTER CATALYST-STABILIZER USAGE
Kenneth T. Barkey, Rochester, N.Y., assignor to Eastman Kodak Company, Rochester, N.Y., a corporation of New Jersey
No Drawing. Filed July 27, 1966, Ser. No. 568,109
8 Claims. (Cl. 260—45.7)

ABSTRACT OF THE DISCLOSURE

In processes for manufacturing stabilized superpolyesters of at least one dicarboxylic acid and at least one glycol, which processes involve an initial melt phase to prepare prepolymer followed by a solid phase to thereby build the molecular weight of the polyester to the desired level; the process being conducted with the use of zinc and titanium catalysts; it has been discovered that surprisingly improved reaction rates and product colors can be obtained by the use of a phosphorus-containing material as a stabilizer, provided that the concentrations of the zinc and titanium catalysts are carefully controlled and at least the major part of the stabilizer is blended into the product after at least about 98.5 percent of the molecular weight buildup has been completed.

---

This invention relates to the preparation of linear superpolyesters of a glycol and a dibasic acid having a molecular weight of at least about 15,000 and ranging upward to 100,000 or more and having an intrinsic viscosity of at least about 0.5. More particularly, this invention relates to novel polyester catalysts and the use thereof in the preparation of superpolyesters.

The preparation of polyesters by esterification or ester exchange and condensation is well known. In the case of poly(ethylene terephthalate), for example, it is customary to react dimethyl terephthalate with ethylene glycol to form a low molecular weight polymer and by-product methanol. After the methanol is nearly completely removed, the reaction temperature is raised and remaining ethylene glycol is removed. The reaction is then continued until a polyester of the desired molecular weight is obtained. The molecular weight of the product may be high enough that the polyester can be used for forming films and fibers. Such a system, whether batch or continuous, is known as a melt polymerization process. In accordance with such process, the polymerization can be continued until a polyester is obtained or the melt process may be stopped at some intermediate point to obtain a prepolymer, i.e. a polymer having a molecular weight of from about 2,000 to about 10,000 and having an intrinsic viscosity, for poly(ethylene terephthalate), of about 0.1 to about 0.45. This material can be stored and subsequently polymerized by re-melting and continuation of the melt process or, more advantageously, it may be crystallized, ground and subjected to solid phase polymerization at lower temperatures either by batch of continuous processes utilizing gas or liquid flow or fluidization techniques.

There are many advantages in preparing polyesters by combining melt ester exchange and prepolymer reactions with solid phase polymerization of the product formed during such reactions. For example, at the temperature levels of powder polymerization, reaction rates from kinetic considerations are lower than those from a melt reaction at higher temperatures. This is compensated by the greater reactivity obtained by having fewer undesirable side reaction effects and products from thermal degradation which can slow the melt reaction in especially its latter stages. There is also an additional advantage of a solid phase process which avoids the removal of decreasing amounts of the evolved ethylene glycol from an increasingly viscous melt. Together these factors usually allow higher molecular weight products to be made with a powder process.

There are, however, certain problems which occur in both the "melt" and solid phase polymerization reactions. For instance, one problem is that the powder, during solid phase polymerization, reacts like a melt but acts like a solid. It is necessary then to heat the powder at temperatures corresponding to the "softening range" of the polyester. For poly(ethylene terephthalate) this is ordinarily in the range of 210–225° C., well below the melting point of 265° C. for the homopolymer. At these temperatures, i.e. 218° C., any entrapped air in the previously pulverized prepolymer will discolor the polyester. Air and oxygen can also cause increased color formation during the casting and cooling of the prepolymer melt and during the grinding operations when the polyester temperature is above 150° C.

Further, it is vitally important that the ester exchange reaction be completed before proceeding with solid phase polymerization. This is because unreacted methoxyl groups can only react with glycol ends and cannot react with themselves or with carboxyl groups. Accordingly, they are chain terminating ends which, unless replaced completely, can play a profound role in slowing the rate of polymerization.

Inherent problems, associated with catalysts, are also inherent in polyester preparation. Some catalysts are effective during ester exchange reactions but are ineffective for solid phase polymerization. The reverse situation is also true. Hence, those skilled in the art have long sought a catalyst which will provide effective rates during both the "melt" phase and solid phase reactions. The catalyst, in addition, and as set forth above, should depress the formation of carboxyl end groups which are deleterious to obtaining practical polymerization rates.

Another problem associated with polyester preparation is the inclusion of undesirable side reactions and thermal degradation which produce aldehydes, water, carbon monoxide, carbon dioxide, unsaturated compound, etc. and other undesirable by-products which contribute to color formation and contaminate the product.

Thus, it is apparent that rapid reaction rates during all phases of polyester manaufacture, (i.e. ester exchange, propolymer melt polymerization and solid phase polymerization) coupled with good stability against color, aldehyde formation, etc. are difficult to obtain together.

Accordingly, the prinicpal object of this invention is to provide a novel catalyst-stabilizer system which provides rapid reaction rates during all phases of polyester manufacture and, at the same time, provides stability against color, aldehyde formation and other deleterious contaminants.

Another object of this invention is to provide a novel catalyst-stabilizer system which is effective in ester exchange, prepolymer and solid phase reactions.

A further object of the invention is to provide a catalyst-stablizer system which retards the formation of carboxyl end groups during a polyesterification process.

Another object of the invention is to provide a catalyst-stablizer system which will inhibit the formation of undesirable by-products during a polyesterification process.

Still another object of the invention is to provide an improved process for the preparation of polyesters.

The above objects, and other objects which will become apparent to those skilled in the art, are attained by the method of this invention which utilizes a catalyst system which consists essentially of an organic or inorganic compound of zinc and a phosphorus-containing compound.

It is known that the preparation of polyesters from a glycol and a dibasic acid is facilitated by the use of catalysts and that polyesterification is a reversible, equilibrium which may be exemplified as follows:

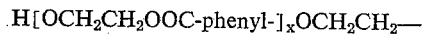

wherein for poly(ethylene terephthalate), R represents $CH_3OOC$-phenyl, $HOCH_2CH_2OOC$-phenyl or

R' represents —$CH_3$ or —$CH_2CH_2OH$ and R'' represents $HOCH_2CH_2$— or

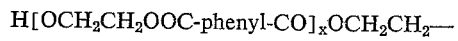

The chemistry is the same for the forward and reverse ester exchange and polymerization reactions. The efficacy of catalysts in the ester exchange and polymerization reactions can be rated by kinetic terms of specific rate constants and energies of activation. Since the polyesterification reaction follows conventional physical chemical kinetics, second order specific rate constants can be calculated for any catalyst which is used at a given temperature. The change of rate of a catalyst with temperature can be expressed by its energy of activation. The rate constant, $k$, and the energy of activation, $E$, therefore define the effectiveness of a catalyst. By expressing the specific rate constants in terms of the equivalent of catalyst used, one catalyst may be compared with another at a reference temperature, for example, 190° C.

In the course of research which led to the discoveries of this invention, it was found that organic and inorganic compounds of zinc are more effective than the corresponding titanium compounds in ester exchange and melt polymerization reactions. This is shown by the table, below, where the rate constant, $k$, is in terms of equivalents of catalyst and $E$ is the energy of activation expressed in kilocalories per equivalent of COOR, wherein R is defined as in Equation 1, above.

TABLE

| Catalyst | k at 190° C. | Relative rates | E |
| --- | --- | --- | --- |
| Zn | 2.8 | 1.0 | 26 |
| Ti | 1.6 | 0.57 | 28 |

As a practical matter, it is believed that there is little difference in the energies of activation of the two catalysts and that 26 kcal. is a reasonable average value. Thus, assuming nearly constant energies of activation for each catalyst, the above data indicate that zinc catalysts are nearly 50 percent more reactive than titanium catalysts. These relationships will be the same at all temperatures of ester exchange and melt polymerization reactions. The above data further indicate that titanium compounds, per se, are of lower order of reactivity and would not ordinarily be used alone for the catalysis of the ester exchange reaction of poly(ethylene terephthalate).

The chemistry of polymerization in the solid phase reaction is the same as in melt polymerization. The rate of reaction in the solid phase, however, depends at least in part on the factor that the polyester is partly crystalline. Titanium and zinc compounds also differ in their effectiveness for suppressing the formation of carboxyl groups during polyester manufacture. Thus it was found that titanium is much more effective than zinc for such purpose. Accordingly, in distinction from their effectiveness in ester exchange and melt polymerization reactions, titanium is more effective than zinc, at 190° C., in the solid phase polymerization of polyesters.

As a practical matter, tetravelent titanium has been found to be a good catalyst, per se, for polyesterification reactions. Unfortunately the titanium reacts with ethylene glycol in the system to produce a product having an undesirable yellow color. It has thus been found that the amount of titanium used must be minimal and it is necessary to balance the titanium catalyst with a zinc catalyst and a phosphorus-containing stabilizer in order to achieve practical polymerization rates and good stabilization.

The combination of the zinc and titanium catalysts with a phosphorus stabilizer, all of which will be described more fully hereinafter, is unexpected since it is known that when sufficient quantities of phosphorus stabilizer are added to a catalyst system containing, for example, 48 p.p.m. titanium compound the later solid phase reaction is reduced to impractical rates. It thus appeared that titanium could not be used alone or with a phosphorus stabilizer. Further, zinc compounds are deactivated by phosphorus compounds and it thus appeared that a zinc catalyst could not be used in the preparation of stabilized polyesters. It thus appeared that addition of a phosphorus stabilizer to the titanium-zinc catalyst system would deactivate the catalyst.

Surprisingly, however, it has been found that, when phosphorus compounds were added to a zinc-titanium catalyst, the melting points of the resulting prepolymers were higher than when the phosphorus compounds were not used. As stated above, however, the concentration of each component of the catalyst-stabilizer system is highly important, as is the point of addition of the stabilizer. For example, if the concentration of zinc compound is too high, an interaction with the other components of the system will take place to give a precipitate which will plug filters and produce a haze in extruded film. If the concentrations of the components are too low the reaction rate will become so low as to be impractical and color and contamination levels in the product will increase.

The zinc component of the catalyst-stabilizer system is used in a concentration of from about 20 to about 80 p.p.m. based on the total weight of the polymer, although somewhat higher or lower concentrations may be used. Preferably, about 32 p.p.m. is used for practical reaction rates.

The titanium component of the system is used in a concentration of from about 5 p.p.m. to about 50 p.p.m., preferably about 24 p.p.m.

It has been determined, for example, that in the ester exchange reaction a minimum of about 24 p.p.m. of titanium component is necessary to obtain a practical rate of reaction. Between about 10 and about 48 p.p.m. of titanium component is nearly as effective as greater amounts thereof but only when the ester exchange reaction has previously been completed.

The phosphorus component of the system is used in amounts such that the phosphorus concentration is from about 50–160 p.p.m., preferably about 65–90 p.p.m.

Exemplary metal compounds which are used in the practice of this invention include those compounds which contain anions capable of dissolving in the reaction mixture, such as alkoxides or compounds capable of reacting with the glycol in the reaction mixture to form alkoxides. Preferred metal compounds are the alkanoates, oxides and/or esters of the metal (such as Zn acetate, Zn acetyl acetonate, Zn acetate dihydrate, titanium dioxide, tetraisopropyl titanate and the like). Of these, the combination of zinc acetate dihydrate and tetraisopropyl titanate are utilized for optimum results and benefits because, as an additional advantage, they are available commercially in practically pure form. Additionally, titanium may be incorporated in the form of salts or double salts of organic or inorganic acids or even as salts of titanium acids. It is extremely important that the metal-containing compounds used as the polyesterification catalysts should be capable of dissolving in and/or reacing with the glycol in the reaction mixture to yield the glycolate of the metal, since this is believed to be the active form of these catalysts. Thus, it is only in this manner that the active ester exchange catalytic reactant (the alkoxide ion) is formed.

Although catalysts that are effective in promoting the desired "ester exchange" reactions are not necessarily effective in suppressing the formation of the undesirable carboxyl end groups, the use of the combination of Zn and Ti catalysts, as described above, has the combined advantages of (a) suppressing the formation of carboxyl "end" groups and (b) increasing the overall polyesterification rate.

The phosphorus-containing compound(s) that is combined with the zinc and titanium compounds in the practice of this invention can be one (or a mixture of one or more) of the phosphorus acids (such as phosphorous or phosphoric acid), or their esters or salts; including, for example, the aryl phosphites and/or aryl phosphates, the alkyl phosphites and/or alkyl phosphates, the cycloalkyl phosphites and/or cycloalkyl phosphates, and the aralkyl phosphites, the alkaryl phosphites and/or alkaryl phosphates, and/or aralkyl phosphates and the like (including those phosphites and phosphates having mixed organic alkyl, aryl and/or cycloalkyl, aralkyl groups). Specific examples of such phosphorus-containing compounds include triphenyl phosphite, tricresyl phosphite, tridecyl phosphite, dibutylphenyl phosphite, phenyl ethel phosphite, trimethyl phosphite, triethyl phosphite, trioctyl phosphite, diamyl phosphite, monoamyl phosphite, diphenoxyethyl phosphite, dicyclohexyl phosphite, tricapryl phosphite, tri-diisobutylphenyl phosphite, triphenylethyl phosphite, tri-diisobutylphenoxyethyl phosphite and the like. Typical useful phosphates include tributyl phosphate, dibutyl phosphate, tetrahydrofurfuryl phosphate, trioctyl phosphate, tri(2-ethylhexyl) phosphate, 2,2,4-trimethyl pentyl phosphate, tri-p-cresyl phosphate, and the like.

The hydrocarbon esters of dicarboxylic acids which may be utilized in the process of the invention are exemplified by the dihydrocarbon esters of acids such as terephthalic acid, trans-hexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenoxy) ethane, 4,4'-dicarboxydiphenyl ether, etc. Fused rings can also be present such as in 2,7-, 1,4- or 2,6-naphthalenedicarboxylic acid. The acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic acid, α-ethylsuberic acid, α,α-diethyladipic acid, dimethylmalonic acid, dicarboxy diethyl ether, isophthalic acid, orthophthalic acid, hexahydro-ortho-phthalic acid, etc. Carbonic acid is an obvious equivalent included among these other acids.

In addition to mixtures of dicarboxylic organic acids, the polyesters defined in this invention can also be modified by the employment of hydroxy acids such as hydroxypivalic acid, hydroxybutyric acid, hydroxycaproic acid, p-hydroxybenzoic acid, etc.

Glycols which are used in the ester interchange reaction are exemplified by such compounds as ethylene glycol, 1,2-propanediol, 1,3-propanediol, 1,4-butanediol, 2,2-dimethyl-1,3-propanediol, 1,4-cyclohexanedimethanol and the like or combinations thereof. The glycol is usually added in a concentration of from about 1.0 to about 10 moles per mole of the dicarboxylic acid ester.

It has been found that the time of addition of the components of the catalyst-stabilizer is extremely important for the success of the system. Thus the phosphorus component should be added only after the ester-exchange reaction has been nearly completed. Such completion is determined when essentially all of the alkanol, from the acid diester and glycol condensation, has been removed from the reaction mixture. If the phosphorus component of the system is added prior to completion of the ester exchange reaction, the zinc component of the catalyst will be at least partially deactivated over a period of time and the ester exchange reaction may not be finished at the start of the prepolymer vacuum cycle. Preferably, just enough phosphorus component for color stability (for example, enough phosphorus-containing stabilizer to produce from about 1 to about 20 parts per million of phosphorus in the reaction mass) is added during the melt phase and the major proportion (enough phosphorus-containing material to bring the total level of phosphorus to from about 50 to about 160 parts per million, based on the weight of the superpolyester product) is added at the end of the polymer cycle.

Phosphorus-containing esters react with and deactivate zinc or manganese compounds that are normally used to catalyze the ester exchange reaction. This interaction, sometimes leading to precipitation, requires time. Stabilizers differ in their reaction rates with zinc or manganese catalysts. Indications are that trialkyl esters require a longer period of time to react than do dialkyl, monoalkyl or phosphorous or phosphoric acid. It is postulated that increasing acidity of the stabilizer itself or that produced by thermal or hydrolytic decomposition of the stabilizer accelerates the reaction between catalysts and stabilizer. Thus by utilizing trialkyl phosphorus-containing esters which have fairly high boiling points so they remain in the system and ones which have good thermal and hydrolytic stabilities, the catalysts remain active and allow the ester exchange reaction to be essentially completed. It must be emphasized that if polyesterification conditions are so specified so that the ester exchange reaction has been essentially completed (over 98.5 percent) in the initial ester exchange reactor that any of the faster reacting stabilizers can be used, since in any case the end result is deactivation of the zinc or manganese catalyst. Thus time of addition of stabilizer is very important, since it is one of many factors which allows or adversely affect the ability to complete the ester exchange reaction. At a product intrinsic viscosity of 0.65, the average polyester molecule has about 100 equivalents of ends per million grams of poly(ethylene terephthalate). On the same basis, there are 10,400 at the beginning of the ester exchange reaction. Since methoxyl and carboxyl groups can only react with glycol ends or free ethylene glycol and not with themselves or with each other if polyesterification reactions are to continue, it is quite apparent that even ten or twenty equivalents of methoxyl or carboxyl end groups can seriously adversely affect the polymerization rate. With most catalyst systems, carboxyl contents range from 25 to 75 equivalents per million grams of poly(ethylene terephthalate). When titanium is used as a catalyst, since it is an excellent esterification catalyst, poly(ethylene terephthalate) can be prepared with zero to fifteen equivalents. Ester exchange reactions should be nearly 100 percent completed by the time the excess of ethylene glycol has been removed, leaving only glycol ends to react with any residual and still unreacted methoxyl groups. At the end of the polymerization, ten unreacted groups (per million grams) would represent 99.9 percent completion of the possible reaction of the materials.

Thus stabilizer addition in the practice of the present invention must be carefully controlled. If it is added at a point where it interferes with the ester exchange reaction primarily and polymerization reactions secondarily, then these cannot be tolerated either.

Reaction conditions are those which are normally used in the preparation of superpolyesters. For example, the temperature of the reaction may vary from about 125–350° C. from the initial ester exchange reaction through the final solid phase powder polymerization. Detailed aspects of the polyesterification process will be readily apparent to those having ordinary skill in this art since the preparation of polyesters such as poly(ethylene terephthalate) which are fiber and film forming has been understood for a number of years and the literature and patented art are quite extensive in this regard. For example, the process of the present invention is preferably carried out in the presence of an inert gas. Such inert gas may be any of such gases which have ordinarily been employed in the prior art, e.g. nitrogen, carbon dioxide, hydrogen, helium, propane, mixtures thereof and other related gases. Inert gas produced by controlled burning of heating gases can also be used.

The polyesterification process of the present invention, as set forth hereinabove, is analogous to similar methods as set forth in the art with the principal exception that it is limited to the novel catalyst-stabilizer system herein set forth and to the method for adding same. For example, in an illustrative embodiment of this invention there is provided a process for preparing a linear superpolyester of at least one glycol and at least one dicarboxylic acid comprising at least 50 mole percent of an acid having two carboxyl radicals attached to a carboxylic nucleus having from 4 to 6 carbon atoms per ring, said superpolyester having a number average molecular weight of 15,000 to about 100,000, an inherent viscosity in a mixture of 60% phenol and 40% tetrachloroethane of at least 0.50 and melting at from about 180° to about 350° C., comprising three phases as follows:

(1) Heating from 1.05 to 2.5 mole proportions or more of said glycol with one mole proportion of said dibasic acid in a form selected from the group consisting of the free acid, a lower alkyl (1 to 6 carbons) ester, anhydride and acid chloride, and thereto there is added a minor amount of a phosphorus-containing stabilizer in the presence of the catalyst system described above and under conditions such that at first there is removed substantially all of any water, hydrogen chloride and alkanol corresponding to said forms of said dibasic acid. Most of the excess of said glycol is then removed whereby an intermediate polyester prepolymer having an inherent viscosity of from about 0.1 to about 0.45 is obtained whereupon a major amount of the phosphorus-containing stabilizer is added.

(2) Comminuting said prepolymer to form solid particles substantially completely passing a 20 mesh screen with less than 25% passing a 200 mesh screen, and (3) In an enclosed polymerizing zone wherein at least 5% of the volume is occupied by said particles, heating at from 5° to 80° C. below the melting point of said prepolymer and between 175° and 300° C. in the presence of an inert gas at about atmospheric pressure which flows through said zone at from about 0.01 to about 100 ml. (preferably from about 0.05 to about 5 ml.) of inert gas per minute per gram of said particles, any of said particles more than 5 mm. from the surface being agitated into contact with said inert gas, whereby a substantially colorless superpolyester having an inherent viscosity of at least 0.5 and generally greater than 0.75 is obtained, said inherent viscosity being at least 0.1 unit greater than for said prepolymer and usually 0.2 or more units greater.

Phase 1 as set forth hereinabove can be conducted as a single operation or can be divided into two separate steps. In the latter case it is sometimes advantageous to perform the initial ester interchange between the glycol and the dibasic acid components in a batch reactor or in a column equipped with plates. Of course other apparatus can also be employed. The reactor or column is advantageously equipped with a reflux device such as packed column or heat exchanger which returns to the reaction zone any of the glycol which might otherwise be lost during the ester interchange step. The lower alkanol is removed from the ester interchange zone. The second step of this first phase can then be accomplished advantageously by heating the ester interchange product in a batch reactor or some other suitable reaction vessel so as to remove a substantial proportion of the glycol in excess of that required to form a polyester. This step is normally advantageously accomplished under reduced pressure which facilitates the removal of the glycol.

The second phase of the described process involving the comminuting of the prepolymer can be accomplished in any convenient manner as long as the particles produced come within the size requirements set forth. According to one method the prepolymer can be cast as a thick sheet of the product of phase 1 and allowed to cool slowly whereby it can be readily broken into small pieces. These pieces can then be ground in any of the commonly available grinding machines so as to produce particles of the appropriate sizes. The slow cooling of the prepolymer as a thick sheet facilitates its developing a crystalline form which makes subsequent comminution relatively easy. Crystallization with regard to the material used to form the comminuted particles is not only useful in preparing the comminuted particles, but it is also advantageous in accomplishing the final polymer buildup.

In preparing the solid particles of prepolymer it is generally advantageous to employ a prepolymer which does not have an intrinsic viscosity any greater than about 0.4–0.45. Usually the prepolymer will have an intrinsic viscosity of no less than about 0.1 and preferably 0.15–0.4.

The powder buildup operation is conducted, as set forth above, in an enclosed polymerizing zone wherein at least 5% of the volume is occupied by the particles. Such a zone can be a horizontal tube, upright cylinder or any other chamber through which inert gas can be conveniently moved across the surface of the particles. Low pressure can also be utilized to aid in removing the ethylene glycol produced during polymerization.

The particles in the polymerizing zone can be advantageously heated at about from 40° to 80° C. below the melting point of the prepolymer. The most effective polymerization temperature depends upon the nature of the polyester and upon the specific catalyst employed. Generally the polymerization temperature is about 200–260° C. although higher and lower temperatures are operable such as 180–350° C., depending upon the melting point and softening characteristics of the polyester.

According to one method of conducting the solid phase polymerization, a prepolymer is finely ground to form solid particles in the 40 to 70 mesh average size which are heated in a horizontal glass or metal tube at the polymerization temperature while a stream of dry nitrogen is passed through the tube and over the bed or polyester particles until the desired increase in the molecular weight of the polyester is obtained. The degree and rate of molecular weight buildup of the prepolymer is somewhat dependent upon the particle size, the polymerization temperature, the rate of flow of the inert gas over the bed of prepolymer, the thickness of the bed of prepolymer, and the diameter of the reaction tube.

The particle size of the prepolymer is advantageously between 30 and 70 mesh although larger or smaller particles may be employed within the limits set forth above. Larger size particles require excessive amounts of gas, tend to introduce discoloration, and slow down the rate of molecular weight buildup. The presence of a very high proportion of particles passing 200 mesh (such as 25% or more) is undesirable since such particles tend to be picked up by the moving gas and carried away.

One way for accomplishing the powder buildup is to conduct the polymerization in apparatus which maintains the solid particles in a fluidized condition. For example, an upright cylindrical fluidized blender can be employed to suspend and agitate particles with hot inert gas while the walls of the blender are maintained at a temperature adequate to heat the particles to accomplish the polymerization. Additional prepolymer can be added to such a blender on a continuous basis and builtup particles can be removed as desired.

Another device is to use a somewhat tilted hollow reaction tube which may have a corrugated cross section and which can be rotated around its longitudinal axis. Prepolymer powder can be introduced into the higher end of the tube and inert gas passed through the tube, preferably through the opposite end. The tube can be designed so that the particles of prepolymer will remain within the tube for a desired period of time while the tube is being rotated and moving the particles downwardly according to the degree of slope of the tube. By using such a rotating tube apparatus the particles of builtup polymer have a substantially uniform intrinsic viscosity and are quite advantageously employed for products where a relatively narrow range of molecular weights is desirable such as in photographic film base or fibers.

The temperature at which the polymerization during the powder buildup is conducted should not be so high as to cause non-frangible agglomeration of the particles during the solid phase polymerization. The maximum temperature which can be employed will be determined, as set forth hereinabove, by the precise conditions employed. By the avoidance of non-frangible agglomeration it is meant that the material should not fuse together completely but should remain in a form such that it is quite frangible and can readily be broken up after the polymerization has been completed.

It is obvious that there are quite a number of variations of the process of this invention among which would be the employment of mixtures of prepolymer particles using different prepolymers.

The following examples will more clearly illustrate the process of the present invention with regard to the novel catalyst-stabilizer system set forth above.

Example 1

This example illustrates the efficiency of titanium for esterifying carboxyl groups. Rate studies were made to compare zinc and titanium catalysts. Terephthalic acid and ethylene glycol were reacted in the presence of the individual catalysts.

| Acid | Catalyst | Relative rates |
|---|---|---|
| Terephthalic | Zn | 0.05 |
|  | Ti | 1.0 |

Titanium catalyzed the esterification reactions much faster than zinc.

Thus, titanium compounds were shown to be good catalysts for carboxyl esterification but zinc, although good for ester exchange and polyesterification reactions, is not active in esterifying carboxyl groups.

Example 2

Film samples formed by extruding poly(ethylene terephthalate) product also showed differences in carboxyl end groups and in the concentration of carboxyl ends.

| P.p.m. catalyst | | | Equiv. COOH 10⁶ g. |
|---|---|---|---|
| Zn | Sb | Ti | |
| 125 |  |  | 60–70 |
|  |  | 48 | 9–13 |
| 65 | 230 |  | 28 |
| 65 | 230 |  | 42 |

Titanium catalyzed poly(ethylene terephthalate) has very low carboxyl content, even after extrusion.

Example 3

This example illustrates the high polyesterification activity of a Zn/Ti catalyst.

| P.p.m. catalyst | | Prepolymer I.V. | Product | |
|---|---|---|---|---|
| Zn | Ti |  | Hours | I.V. |
| 37 | 10 | 0.39 | 2.5 | 0.68 |
| 0 | 48 | 0.37 | 2.5 | 0.68 |
| 37 | 0 | 0.42 | 6.0 | 0.56 |

The above data thus illustrates that a zinc and titanium combination shows high polyesterification activity.

Example 4

The following materials were loaded into an ester exchange reactor under nitrogen atmosphere:

| | |
|---|---|
| Dimethyl terephthalate _____lb__ | 100 |
| Ethylene glycol (EG/DMT-1.72) _____lb__ | 55 |
| Neopentyl glycol (NPG), 2 mole percent ____lb__ | 1.11 |
| Zinc acetate dihydrate, 32.5 p.p.m. of zinc ____g__ | 5.0 |
| Tetraisopropyltitanate in ethylene glycol containing 0.1 percent water, 24 p.p.m. of titanium ____g__ | 6.5 |

The vessel was heated while the contents were agitated. The table below summarizes the ester exchange data:

| Time hr. | Jacket temperature | | Contents temperature | | Pounds methanol | Percent completion |
|---|---|---|---|---|---|---|
|  | °F. | °C. | °F. | °C. | | |
| 0 | 400 | 204 | 355 | 179 | 0 | 0 |
| 0.25 | 500 | 260 | 350 | 177 | 7 | 21 |
| 0.50 | 510 | 266 | 365 | 185 | 12.5 | 38 |
| 0.75 | 510 | 266 | 375 | 191 | 18 | 54 |
| 1.00 | 510 | 266 | 385 | 196 | 22 | 67 |
| 1.25 | 510 | 266 | 395 | 202 | 25.5 | 77 |
| 1.50 | 510 | 266 | 405 | 207 | 28.5 | 86 |
| 1.75 | 510 | 266 | 410 | 210 | 30 | 91 |
| 2.00 | 510 | 266 | 415 | 213 | 31 | 94 |
| 2.25 | 510 | 266 | 420 | 216 | 32.5 | 98 |

At 2.25 hours, 18 g. 400 p.p.m. of bis(cyclic 2,2-dimethyltrimethylene) 1,4-cyclohexylenedimethylene phosphite (65 p.p.m. of P) was added to the reactor. The polyester melt, the so-called "monomer," had an average degree of polymerization of slightly less than four. The melt also contained by calculation about fourteen pounds of free ethylene glycol which was available to complete the ester exchange reaction during the time period that it was being distilled from the melt.

The polyester melt from the ester exchange reactor was filtered in four minutes into the prepolymer reactor heated at 525° F. (274° C.). The contents were heated for one hour to remove the excess of ethylene glycol, essentially complete the ester exchange reaction, and to raise the temperature of the contents to 490° F. (254° C.). Vacuum was slowly applied in 50 minutes. Full vacuum was continued for forty minutes:

| Minutes of full vacuum | Pressure, microns | Load on agitator, relative scale | Jacket temperature | | Melt temperature | |
|---|---|---|---|---|---|---|
|  |  |  | °F. | °C. | °F. | °C. |
| 0 | 4,200 | 100 | 525 | 274 | 490 | 254 |
| 10 | 250 | 106 | 510 | 266 | 492 | 256 |
| 20 | 175 | 126 | 500 | 260 | 491 | 255 |
| 30 | 250 | 144 | 500 | 260 | 490 | 254 |
| 40 | 250 | 152 | 500 | 260 | 490 | 254 |

Total prepolymer time was 2.5 hours. The reactor was returned to atmospheric pressure with nitrogen. The prepolymer melt was cast on a stainless steel belt; the solids were broken and ground to about an average of 80 mesh size before polymerization in vacuum at 420° F. (216° C.).

In the powder buildup reactor were loaded 102 lb. of the prepolymer. Outside jacket temperature was 450° F. (232° C.). After loading, the reactor pressure was reduced to 200 microns to rid the system of most of the air. The batch was agitated until the contents temperature was 420° F. The agitator was stopped and the vacuum was applied slowly during 15 minutes. The outside jacket temperature was lowered to 420° F. (216° C.). After the vacuum was applied, the batch was agitated one minute every fifteen minutes.

| Minutes of full vacuum | Jacket temperature | | Powder temperature | | Pressure, microns |
|---|---|---|---|---|---|
|  | °F. | °C. | °F. | °C. | |
| 0 | 450/420 | 232/216 | 420 | 216 | _____ |
| 0.5 | 420 | 216 | 420 | 216 | 225 |
| 1.0 | 420 | 216 | 420 | 216 | 170 |
| 2.0 | 420 | 216 | 419 | 215 | 170 |

At the completion of the reaction, the contents were cooled at atmospheric pressure of nitrogen until below 300° F. (148° C.). The powder was screened and stored for future extrusion tests.

|  | Prepolymer | Product |
|---|---|---|
| Analyses: | | |
| Intrinsic viscosity | 0.39 | 0.63 |
| Color value (C.V.) | 18.0 | 19.7 |
| Melting point, ° C | 253 | 253 |
| COOH, eq./10⁶, g | 23 | 20 |

A color value of about 14 is considered the lowest possible; a value below 26 is considered satisfactory for most photographic film applications. A carboxyl analysis of the product (but not the prepolymer) in equivalents of ends per million grams of polyester is roughly equal to the percentage of ends that are carboxyl instead of glycol (or possibly unreacted methoxyl groups).

This example illustrates that rapid rates for all three parts of the reaction were obtained with low carboxyl ends and low color values.

Example 5

The following table shows the greatly reduced levels of aldehydic contaminants.

TABLE

| Poly (ethylene terephthalate) | Control, Zn/Ti | | Run 1, Zn/Ti & 400 p.p.m. CHDMP¹ | | Run 2, Zn/Ti & 400 p.p.m. CHDMP¹ | |
|---|---|---|---|---|---|---|
| Roll | 2 | | 4 | | 6 | |
| Sheet thickness, mils | 6.9 | | 6.7 | | 6.8 | |
| Sheet density gms./cc | 1.3910 | | 1.3879 | | 1.3910 | |
|  | Length | Width | Length | Width | Length | Width |
| Tensile properties: | | | | | | |
| Break, p.s.i | 28,800 | 28,200 | 26,700 | 28,000 | 25,000 | 25,200 |
| Break elongation, percent | 146 | 113 | 160 | 120 | 156 | 107 |
| Yield, p.s.i | 14,800 | 15,400 | 14,000 | 14,000 | 14,000 | 14,000 |
| Yield elongation, percent | 5.8 | 4.2 | 5.6 | 4.1 | 5.1 | 4.1 |
| Modulus, ×10⁵, p.s.i | 6.2 | 7.1 | 5.9 | 7.0 | 5.9 | 6.8 |
| Heat Distortion: | | | | | | |
| Temp. at 2% shrink, ° C | 193 | 183 | 192 | 188 | 208 | 198 |
| Maximum shrink, percent | 7.9 | 4.7 | 12.0 | 6.3 | 7.7 | 5.0 |
| Unmolding stress, p.s.i | 214 | 221 | 218 | 307 | 140 | 122 |

| | Aldehydic contaminants | | |
|---|---|---|---|
| Sample | Acetaldehyde | Crotonaldehyde | 2-methyl-1,3-dioxolane |
| Control | 50 | 15 | 13 |
| Run 1 | <1 | <1 | <1 |
| Run 2 | 2 | 2 | 1 |

¹ CHDMP = cyclohexanedimethanol-bis-neopentyl phosphite.

The resin tested to obtain the above data was prepared by blending batches of resin as prepared in Example 4.

The processing and contaminant evaluations for each resin batch were made at extrusion temperatures of 540° F. (282° C.). No extrusion difficulties were encountered with any of the experimental resins. The color of the cast sheet was essentially water-white.

Example 6

In a process generally similar to that of Example 4, above, using a zinc-antimony catalyst system, color stabilization was not required during the manufacture of the prepolymer. Instead, 500 p.p.m. of trioctyl phosphate stabilizer was added at the end of the prepolymer reaction, just prior to the casting step. After completion of the final polyesterification step the resulting polymer (intrinsic viscosity equals 0.6) was extruded into a 10 mil film. It was analyzed for aldehydic contaminants and compared to a control polymer film to which no stabilizer had been added. Results of this comparison are summarized in the following table.

TABLE.—P.P.M. OF CONTAMINANTS

|  | Acetaldehyde | Crotonaldehyde | 2-Me-1,3-dioxolane |
|---|---|---|---|
| Control | 109 | 6 | 6 |
| Invention | 17 | <1 | 3 |

From this it can be seen that addition of the phosphorus-containing stabilizer just prior to the solid phase polymerization step was extremely effective in controlling contaminants that would ordinarily have been formed during the extrusion of the resulting superpolymerized polyester product.

Example 7

(a) Following the procedures described in Examples 4 and 5, above, a phosphate stabilizer, tri-(2-ethylhexyl)-phosphate, was used. In this instance the stabilizer (70 p.p.m. based on P, or 1000 p.p.m. of stabilizer) was added at the end of the ester exchange reaction. The following data resulted from this test:

P.P.M. OF CONTAMINANTS

|  | Acetaldehyde | Crotonaldehyde | 2-Me-1,3-dioxolane |
|---|---|---|---|
| Control | 109 | 6 | 6 |
| Example 7(a) | 25 | 2 | 3 |

Color

Control _____ 16.4
Example 7(a) _____ 17.2

(b) In an otherwise similar process as that just described, a small amount of the same stabilizer (20 p.p.m. of P) was added at the end of the ester exchange reaction, but most of the stabilizer (50 p.p.m. of P) was retained and added just prior to the final extrusion (into film) step:

P.P.M. OF CONTAMINANTS

|  | Acetaldehyde | Crotonaldehyde | 2-Me-1,3-dioxolane |
|---|---|---|---|
| Control | 109 | 6 | 6 |
| Example 7(b) (this invention) | 13 | <1 | 1 |

Color

Control _____ 16.4
Example 7(b) _____ 14.5

From Example 7, it can be seen that aldehydic contaminants were unexpectedly greatly reduced by practicing the technique of adding the stabilizer in two parts, being careful to retain a substantial portion to be added after practically all (at least about 98.5%) of the glycol has been removed from the polyesterification reaction zone. Thus, in general commercial polyester production a minor amount of phosphorus-containing stabilizer [not enough to deactivate more than a small proportion of the catalyst(s)] can be utilized early in the overall process (e.g., starting with the ester exchange step, or being added into the prepolymer "melt" at any desired stage of that reaction) so that the polyesterification reaction rates are not seriously affected (by the presence of a relatively small amount of P-containing stabilizer), but nevertheless the color is stabilized sufficiently. Then subsequently a much larger amount of the stabilizer should be added, only after practically all (at least about 99.5%) of the glycol has been evolved from the polyesterification reaction zone. Thus, although for optimum results, this "larger amount" should be added subsequent to the polyesterification reaction, it can be advantageously used or added at any stage of the overall process after the substantial completion of the "prepolymer" reaction step.

In the foregoing examples, a value of 14.0 for "color" is perfect, and any figure below about 20 is very good; the lower, the better; while "color" value below about 26 represent commercially practical "colors."

Accordingly, it has been shown that the Zn-Ti-P catalyst stabilizer system of this invention gives rapid rates for ester exchange, prepolymer, and solid phase polymerization reactions and also stabilizes the polyester powder, film or fiber. In addition, filter plugging during manufacture and residual haze in the extruded clear product are at practical and minimum levels.

Obviously, many modifications and variations of the present invention are possible in the light of the above teachings. It is therefore to be understood that, within the scope of the appended claims, the invention may be practiced otherwise than as specifically described.

What is claimed is:

1. In a process for manufacturing a stabilized superpolyester of at least one discarboxylic acid and at least one bifunctional glycol, which process comprises the steps of (1) forming a prepolymer by polymerizing an appropriate dicarboxylic acid-glycol monomer in admixture with zinc and titanium catalyst compounds, (2) solidifying and comminuting said prepolymer, and (3) in a solid phase polymerization step, heating said prepolymer in the presence of an inert gas until said superpolyester is produced; the improvement which comprises (a) utilizing during said polymerization step from about 5 to about 50 parts per million of titanium and from about 20 to about 80 parts per million of zinc based on the weight of said superpolyester, and (b) intermixing with said superpolyester, after at least about 98.5 weight percent of the removable glycol has been removed from the polymerizing material, an amount of phosphorus-containing material sufficient to introduce into said superpolyester from about 50 to about 160 parts per million of phosphorus, based on the weight of said superpolyester; said phosphorus-containing material being selected from the group consisting of phosphoric acid, phosphorous acid, alkyl phosphates, alkyl phosphites, aryl phosphates, aryl phosphites, alkaryl phosphates, alkaryl phosphites, aralkyl phosphates, aralkyl phosphites and mixtures thereof.

2. An improved process as in claim 1, wherein (a) a minor proportion of said phosphorus-containing material is added to said dicarboxylic acid glycol monomer, whereby the color stability of said polyester is maintained during the early steps of said process, and a major proportion of said phosphorus-containing material is added to said superpolyester after at least about 99.5 weight percent of said removable glycol has been removed.

3. An improved process as in claim 2, wherein said minor proportion is enough of said phosphorus-containing material to yield from about 1 to about 20 parts per million of phosphorus, based on the weight of said dicarboxylic acid-glycol monomer, and said major proportion is enough of said phosphorus-containing material to yield a total of from about 50 to about 160 parts per million of phosphorus in said superpolyester.

4. An improved process as in claim 1, wherein said zinc and titanium catalyst compounds are selected from the group consisting of zinc and titanium alkanoates, oxides, and esters.

5. An improved process as in claim 1, wherein at least a major proportion of said phosphorus-containing material is intermixed with said superpolyester after said solid phase polymerization step has been substantially completed.

6. An improved process as in claim 3, wherein said major proportion of said phosphorus-containing material is added to said superpolyester after said solid phase polymerization step has been substantially completed.

7. An improved process as in claim 1, wherein said superpolyester is poly(ethylene terephthalate).

8. An improved process as in claim 1, wherein said phosphorus-containing material is selected from the group consisting of phosphoric acid, phosphorous acid, triphenyl phosphite, tricresyl phosphite, tridecyl phosphite, dibutylphenyl phosphite, phenyl ethyl phosphite, trimethyl phosphite, triethyl phosphite, trioctyl phosphite, diamyl phosphite, monoamyl phosphite, diphenoxyethyl phosphite, dicyclohexyl phosphite, tricapryl phosphite, tri-diisobutylphenyl phosphite, triphenylethyl, phosphite, tri-diisobutylphenoxyethyl phosphite, tributyl phosphate, dibutyl phosphate, tetrahydrofurfuryl phosphate, trioctyl phosphate, tri(2-ethylhexyl)phosphate, 2,2,4-trimethyl pentyl phosphate, tri-p-cresyl phosphate, and mixtures thereof.

References Cited

UNITED STATES PATENTS

| 3,028,366 | 4/1962 | Engle et al. | 260—75 |
| 3,068,204 | 12/1962 | Perry et al. | 260—75 |

FOREIGN PATENTS

| 791,283 | 2/1958 | Great Britain. |
| 567,821 | 12/1958 | Canada. |

DONALD E. CZAJA, Primary Examiner.

M. J. WELSH, Assistant Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,404,121　　　　　　　　　　　　October 1, 1968

Kenneth T. Barkey

It is certified that error appears in the above identified patent and that said Letters Patent are hereby corrected as shown below:

Column 3, line 4, "$H[OCH_2CH_2OOC\text{-phenyl-}]_xOCH_2CH_2\text{-}$" should read -- $RCOOR' + R''OH \rightleftharpoons RCOOR'' + R'OH$ --; line 8, "$H(OCH_2CH_2OOC\text{-phenyl-}CO)_xOCH_2CH_2\text{-}OOC\text{-phenyl}$" should read -- $H(OCH_2CH_2OOC\text{-phenyl-}CO)_xOCH_2CH_2OOC\text{-phenyl}$ --; line 45, "kcal." should read -- kg. cal. --. Column 11, line 31, "1,3910" should read -- 1.3910 --.

Signed and sealed this 17th day of February 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents